United States Patent
Mitchell

(10) Patent No.: US 8,515,202 B2
(45) Date of Patent: Aug. 20, 2013

(54) REDUCTION OF BLOCKING ARTIFACTS IN IMAGE DECOMPRESSION SYSTEMS

(75) Inventor: Arthur Mitchell, Winchester (GB)

(73) Assignee: Ericsson AB, Stockholm (SE)

( * ) Notice: Subject to any disclaimer, the term of this patent is extended or adjusted under 35 U.S.C. 154(b) by 910 days.

(21) Appl. No.: 12/513,980

(22) PCT Filed: Nov. 12, 2007

(86) PCT No.: PCT/GB2007/004311
§ 371 (c)(1), (2), (4) Date: Aug. 12, 2009

(87) PCT Pub. No.: WO2008/056178
PCT Pub. Date: May 15, 2008

(65) Prior Publication Data
US 2009/0322951 A1 Dec. 31, 2009

(30) Foreign Application Priority Data
Nov. 10, 2006 (GB) .................................. 0622485.1

(51) Int. Cl.
*G06K 9/40* (2006.01)
*H04N 7/12* (2006.01)

(52) U.S. Cl.
USPC .......................................... 382/268; 348/607

(58) Field of Classification Search
USPC ................. 382/176, 254, 260–264, 266, 268, 382/272, 275; 375/240.01, 240.25, 240.27, 375/240.29, E07.076, E07.078; 348/14.08, 348/14.13, 241, 607
See application file for complete search history.

(56) References Cited

U.S. PATENT DOCUMENTS

| 7,593,465 B2* | 9/2009 | Jia et al. ................... 375/240.25 |
| 2003/0081854 A1 | 5/2003 | Deshpande |
| 2005/0024487 A1* | 2/2005 | Chen .......................... 348/14.13 |
| 2005/0196043 A1* | 9/2005 | Jung et al. ..................... 382/176 |
| 2005/0276505 A1* | 12/2005 | Raveendran .................. 382/268 |
| 2006/0133689 A1 | 6/2006 | Andersson et al. |
| 2006/0171467 A1 | 8/2006 | Schoner |
| 2009/0322951 A1* | 12/2009 | Mitchell ....................... 348/607 |
| 2010/0316139 A1* | 12/2010 | Le Leannec et al. ..... 375/240.29 |
| 2011/0255589 A1* | 10/2011 | Saunders et al. ......... 375/240.01 |

FOREIGN PATENT DOCUMENTS

| EP | 0577350 A2 | 1/1994 |
| EP | 0666695 A2 | 8/1995 |
| EP | 0781053 A2 | 6/1997 |
| EP | 1659798 A2 | 5/2006 |
| WO | 00/42778 | 7/2000 |

OTHER PUBLICATIONS

Atzori, L. et al. "Low-Complexity Post-Processing for Artifact Reduction in Block-DCT Based Video Coding." 2000 International Conference on Image Processing, vol. 2, 2000, pp. 668-671.
Kong, H.-S. et al. "Edge Map Guided Adaptive Post-Filter for Blocking and Ringing Artifacts Removal." IEEE International Symposium on Circuits and Systems (ISCAS), vol. 3, May 2004, pp. 929-932.

* cited by examiner

*Primary Examiner* — Amir Alavi
(74) *Attorney, Agent, or Firm* — Coats & Bennett, P.L.L.C.

(57) ABSTRACT

A method and apparatus for reducing blocking artefacts in a decompressed image signal includes inputting the decompressed video signal and detecting locations of block and image content edges therein. Image content and block edges are discriminated between to remove or conceal the image content edges and the remaining block edges transformed to produce an error correcting signal to smooth the block edges at the detected locations in a delayed version of the decompressed video signal.

30 Claims, 16 Drawing Sheets

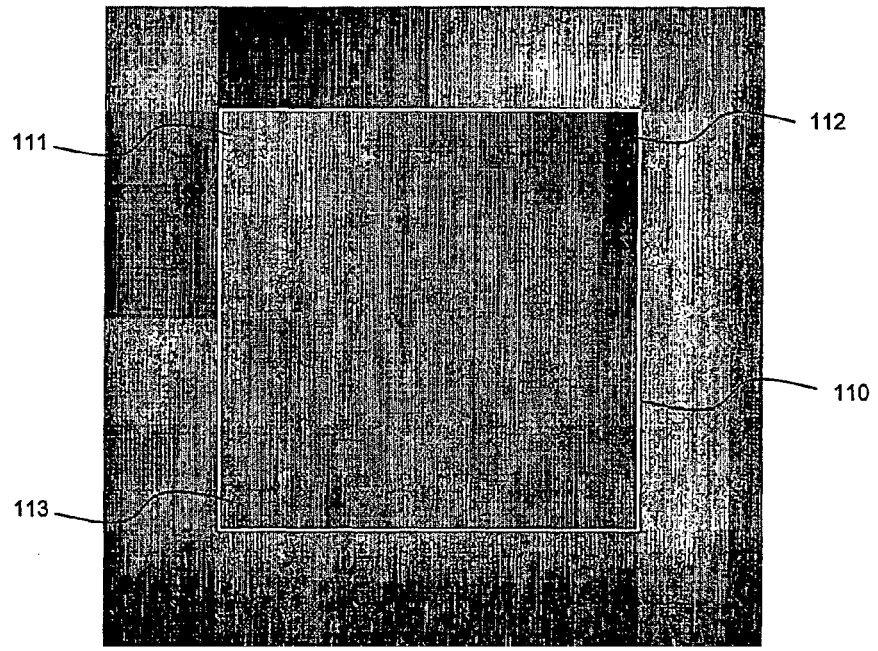
Figure 11b
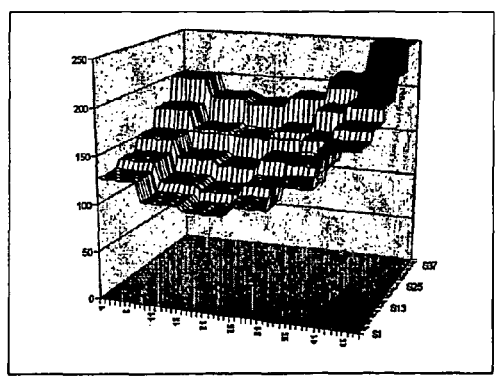 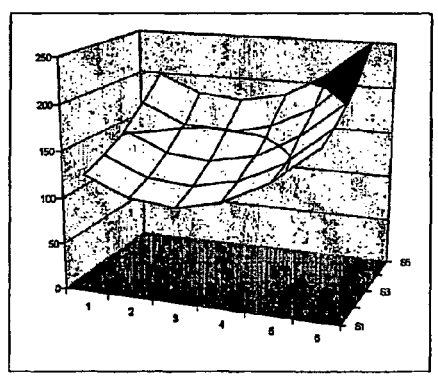
Figure 12a				Figure 12b

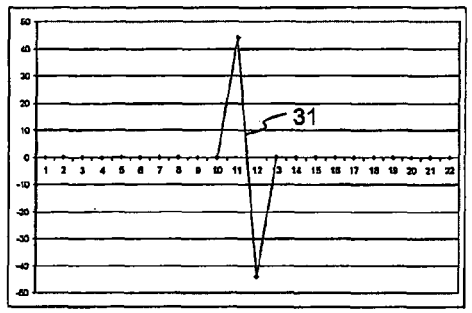
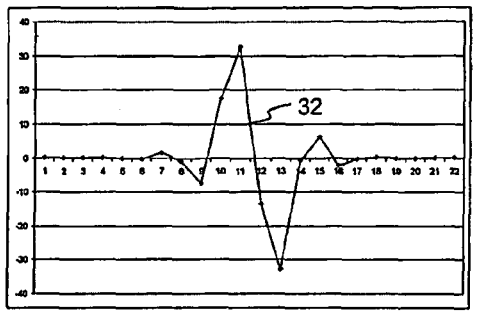
Fig. 13a
Fig. 13b
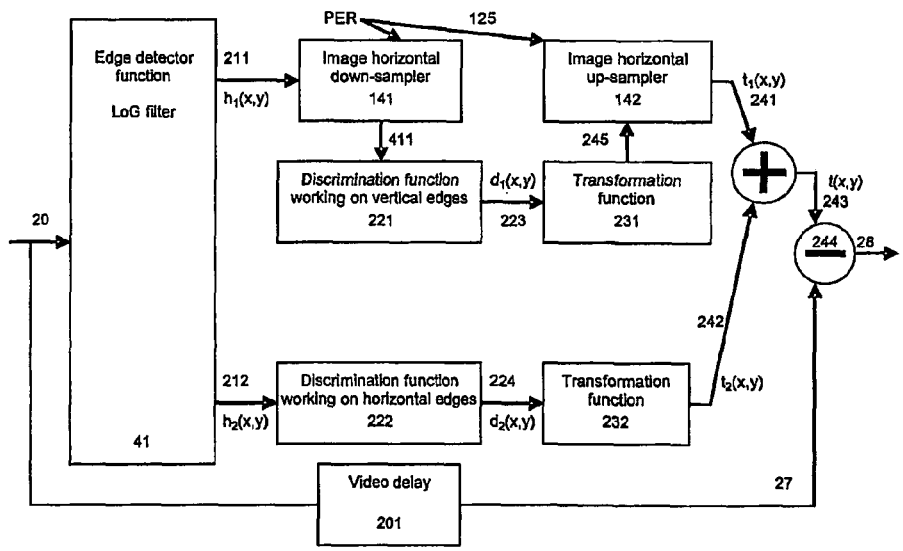
Fig. 14

REDUCTION OF BLOCKING ARTIFACTS IN IMAGE DECOMPRESSION SYSTEMS

This application is a 371 of PCT/GB2007/004311 filed on Nov. 12, 2007.

This invention relates to reduction of blocking artefacts in image decompression systems.

Image compression systems are now well established in delivery and storage of audiovisual media. These systems reduce bandwidth or storage requirements of video by using spatial and temporal redundancy in an image as well as mathematical transforms such as Fourier, discrete cosine and entropy coding that minimise a number of symbols needed to represent the image in a compressed domain.

A common technique used in such algorithms is reduction of spatial information by using block-based mathematics on groups of adjacent picture elements (pels). This commonly involves a discrete cosine transform or integer transforms that represent the spatial information in the frequency domain. This allows two means of compression of the image: first a differentiation can be drawn between significant and less significant frequency components with the latter being discarded, second the remaining components can be quantised by dividing by a variable called a quantiser scale code.

An advantage of quantising the frequency components arises in an entropy coding stage which usually follows quantisation. More strongly quantised coefficients will pack into fewer symbols on application of a well-designed entropy-coding algorithm.

However, this quantisation leads to an artefact called blocking. Rounding errors from the division of the coefficients by the quantiser scale code tend to result in a spatial distortion of the coded image within a block of pels operated on, but more significantly from one block to an adjacent block there will frequently be an abrupt discontinuity of luminance or chrominance levels at the block boundary following decompression.

FIG. 1 shows schematically a graphical view of the results of block-based quantisation, showing a representation of the luminance level of a two-dimensional parabolic curve. Groups of adjacent pels in an 8 by 8 block have been modified to represent an approximation of the artefacts introduced by block based coding.

This is a significant impairment to the image and, being a non-linear and artificial error, tends to impact strongly on a viewer's perception of the image quality on decompression.

There are several papers in the public domain concerning means of reducing the perception of the block boundaries, e.g. S. C. Tai, Y. R. Chen, C. Y. Chen, Y. H. Chen; "Low complexity deblocking method for DCT coded video signals" IEE Proc. Vision, image and signal processing 153(1), 2006, pp 46-56 and S. D. Kim, H. M. Kim, J Yi, J. B. Ra; "A deblocking filter with two separate modes in block-based videocoding" IEEE Trans. Circuits and systems for video technology 9(1), February 1999, pp 156-160.

These known approaches involve softening an image at fixed block boundaries leading to a further loss of resolution. The known techniques also rely on a fixed grid of blocks and do not allow for the appearance of block edges through spatial prediction off this fixed grid.

Many of the proposed systems also require knowledge of the quantiser scale code used to divide the coefficients in the encoding stage. This requires that this information is passed on by some decoding apparatus to the de-blocking system or that an estimate is made of the quantiser scale code.

However, it may not be possible to obtain the quantiser scale code for each block from the decoding stage and estimating the quantiser scale code based on the video content is unreliable. Many known algorithms for this estimation also have a number of parameters and thresholds, which must be adjusted to optimise performance for a given image content. This is undesirable in real systems and leads to poor performance.

There therefore remains a requirement for a system that provides good concealment of the block edges without removing the remaining high frequency detail and which does not need the level of coefficient quantisation to be supplied or estimated.

It is an object of the present invention at least to ameliorate the aforesaid shortcomings in the prior art.

According to a first aspect of the present invention there is provided an apparatus for reducing blocking artefacts in a decompressed image signal comprising: a video signal input; delay means connected to the video signal input; block and image content edges detection means, comprising an edge detection function, connected to the video signal input in parallel to the delay means; image content edge and block edge discriminating means connected to an output of the block and image content edges detection means; block edge concealing means connected to outputs of the delay means and the image content edge and block edge discriminating means.

Conveniently, the edge definition function is one of a Sodel, Kirsch and pseudo-Laplace function.

Preferably, the block and image content edges detection means comprises a Laplacian of Gaussian filter.

Advantageously, the image content and block edges discriminating means comprises means for removing or attenuating the image content edges.

Conveniently, the image content and block edges discriminating means comprises means for removing local DC signal from a transform domain signal.

Alternatively, the image content and block edges discriminating means comprises means for non-linear orthogonal correlation.

Preferably, the image content and block edges discriminating means comprises means for separately discriminating between vertical and horizontal image content edges and vertical and horizontal block edges.

Advantageously, the block edge concealing means comprises means for locating a nearest profile to a pel indicating a block edge transition and changing a value of the pel proportionally to a size of the transition and a distance of the pel from the transition to produce an error correcting signal and adding means for adding the error correcting signal to a delayed version of the decompressed video signal output from the delay means.

Advantageously, the apparatus further comprises a pre-processing stage arranged to determine an average size of block edge transitions in an image and to determine from the average size a threshold size of transition above which edges are not removed, and to output a corresponding threshold signal.

Preferably, the pre-processing stage is arranged to determine sizes of block edge transitions over at least one portion of an image.

Conveniently, the pre-processing stage comprises a Laplacian of Gaussian filter to detect horizontal edges.

Advantageously, the pre-processing stage comprises counting means arranged to count lines of a video image to determine locations where blocking edges may be expected from a known blocking size and to determine sizes of edge transitions only at those locations.

Preferably, the block and image content edges detection means comprises means for separately detecting horizontal and vertical edges.

Advantageously, the apparatus comprises:
a. block edge and image edge detection means arranged to output a vertical edge location signal and a horizontal edge location signal;
b. image horizontal down-sampler means arranged to receive and to down-sample the vertical edge location signal using a previously encoded resolution of the decompressed image signal;
c. image and block vertical edge discriminating means connected to an output of the down sampler arranged to remove or conceal the vertical image edges;
d. vertical edge transformation means for locating a nearest profile to a pel indicating a block vertical edge transition and determining a vertical edge error correcting signal for changing a value of a pel proportional to a size of the transition and a distance of the pel from the transition;
e. image horizontal up-sampler means connected to an output of the vertical edge transformation means arranged to up-sample the vertical edge error correcting signal;
f. image content and block horizontal edge discriminating means connected to receive the horizontal edge location signal and to delete or conceal the horizontal image edges;
g. horizontal edge transformation means for locating a nearest profile to a pel indicating a block horizontal edge transition and determining a horizontal edge error correcting signal for changing a value of a pel proportionally to a size of the transition and a distance of the pel from the transition;
h. adding means for adding the up-sampled vertical error correcting signal and the horizontal edge error correcting signal to form a combined error correcting signal; and
i. subtracting means to subtract the combined error correcting signal from a delayed version of the decompressed video signal output from the delay means.

According to a second aspect of the invention, there is provided a method of reducing blocking artefacts in an image compression system comprising the steps of: inputting a video signal; detecting block and image content edges with an edge detection function; discriminating between image content and block edges; and concealing the block edges.

Conveniently, the step of detecting block and image content edges comprises using a Sodel, Kirsch or pseudo-Laplace function.

Preferably, the step of detecting block and image content edges comprises using a Laplacian of Gaussian filter.

Advantageously, the step of discriminating between image content and block edges comprises removing or concealing the image content edges.

Conveniently, the step of discriminating between image content and block edges comprises local DC signal removal from a transform domain signal.

Alternatively, the step of discriminating between image content and block edges comprises non-linear orthogonal correlation.

Preferably, the step of discriminating between image content and block edges comprises separately discriminating between vertical and horizontal edges.

Advantageously, the step of concealing the block images comprises locating a nearest profile to a pel indicating a block edge transition and changing a value of the pel proportionally to a size of the transition and a distance of the pel from the transition.

Advantageously, the method comprises a pre-processing step of determining an average size of block edge transitions in an image and determining from the average size a threshold size of transition above which edges are not removed.

Preferably, determining an average size of block edge transitions comprises determining sizes of block edge transitions over at least one portion of an image.

Conveniently, the pre-processing step comprises using a Laplacian of Gaussian filter to detect horizontal edges.

Advantageously, the pre-processing step comprises counting lines of a video image to determine locations where blocking edges may be expected from a known blocking size and determining sizes of block edge transitions only at those locations.

Preferably, the step of detecting block and image content edges comprises separately detecting horizontal and vertical edges.

Advantageously, the method further comprises: detecting locations of vertical and horizontal block and image edges and generating a vertical edge location signal and a horizontal edge location signal; down-sampling the vertical edge location signal using a previously encoded resolution of the video signal; discriminating between vertical image edges and vertical block edges using the down sampled signal to form a vertical edge correcting signal; up-sampling the vertical edge correcting signal using the previously encoded resolution of the video signal to form an up-sampled vertical edge correcting signal; discriminating between horizontal image edges and horizontal block edges to form an horizontal edge correcting signal; and combining the vertical and horizontal edge correcting signals with a delayed version of the input video signal to reduce blocking artefacts.

Conveniently, the step of forming a vertical or horizontal edge correcting signal comprises locating a nearest block edge transition to a pel and forming an edge correcting signal arranged to change a value of the pel proportional to a size of the transition and a distance of the pel from the transition.

According to a third aspect of the invention, there is provided a computer program product comprising code means for performing all the steps of the method described above when the program is run on one or more computers.

According to a fourth aspect of the invention there is provided a computer program product as described above embodied by a computer storage medium.

The invention will now be described, by way of example, with reference to the accompanying drawings in which.

Figure 1:
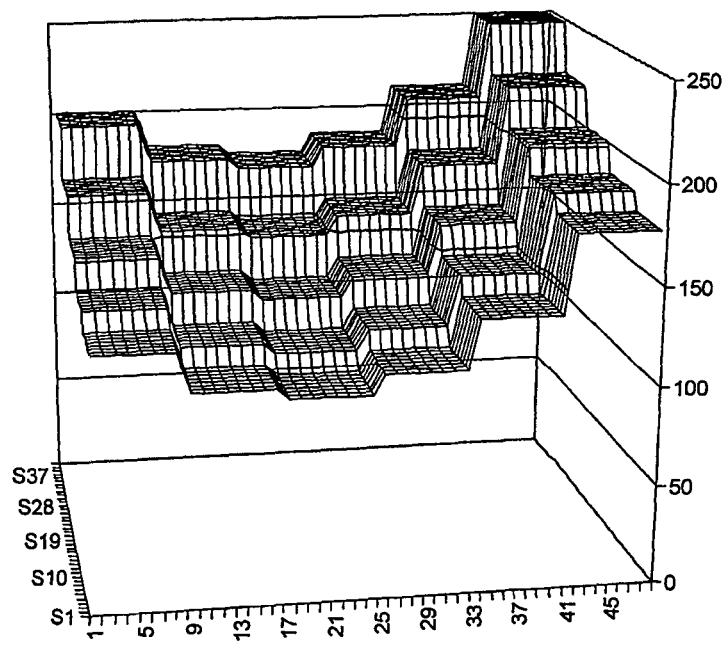
FIG. 1 is a graphical representation of a quantised 'blocked' surface.
Figure 5:
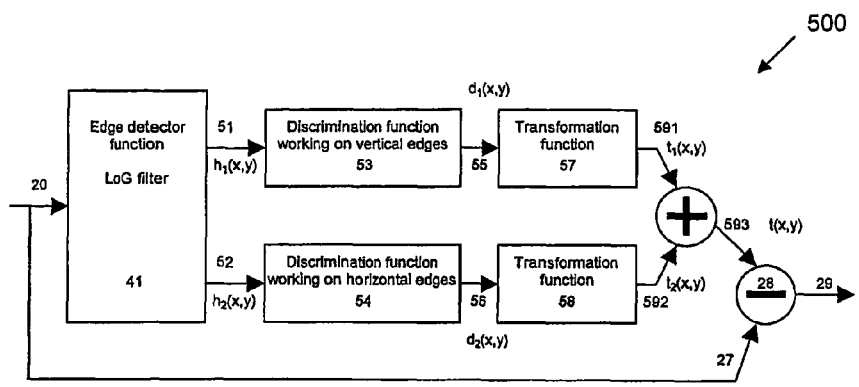
FIG. 5 is schematic diagram of the system of FIG. 4 using a LoG filter with separated data sets for vertical and horizontal edges.
Figure 11A:
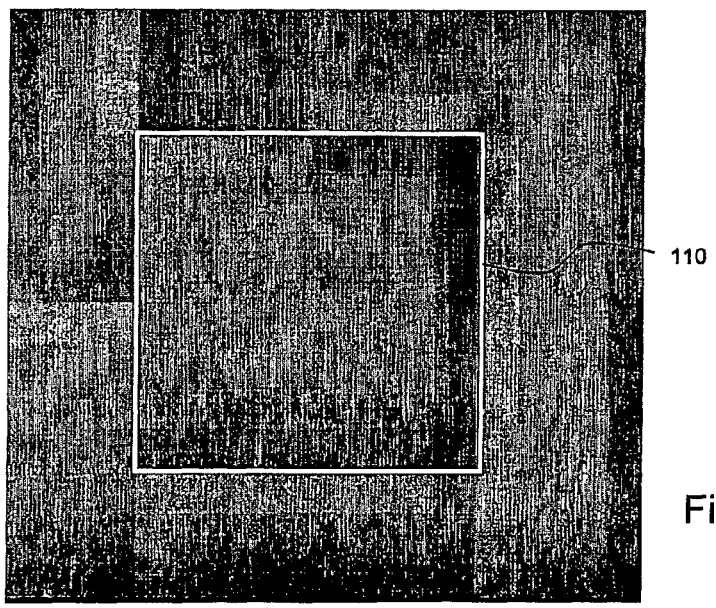

FIGS. 11*a* and 11*b* are representations of data sets d(x,y) and t(x,y) of FIG. 5;

FIG. 12*a* is a graphical representation of the data from FIG. 1;

FIG. 12*b* is a graphical representation of a version of the data of FIG. 12*a* with a blocking artefact correction applied according to the invention.

Figure 2:
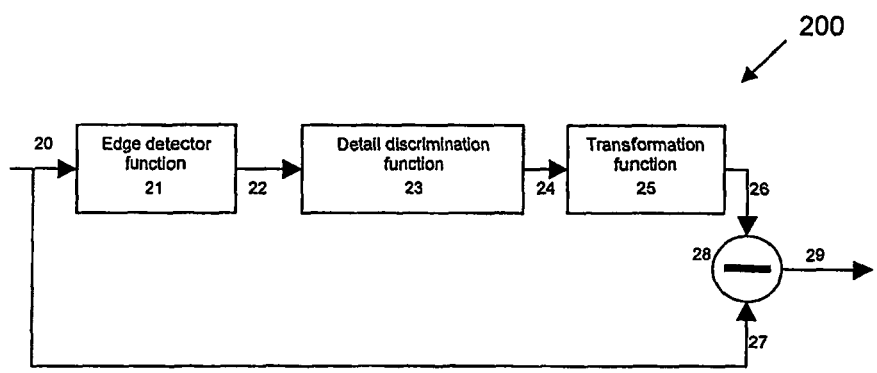
FIG. 2 is a schematic diagram of an embodiment of a basic system for removing blocking artefacts according to the invention.
Figure 15:
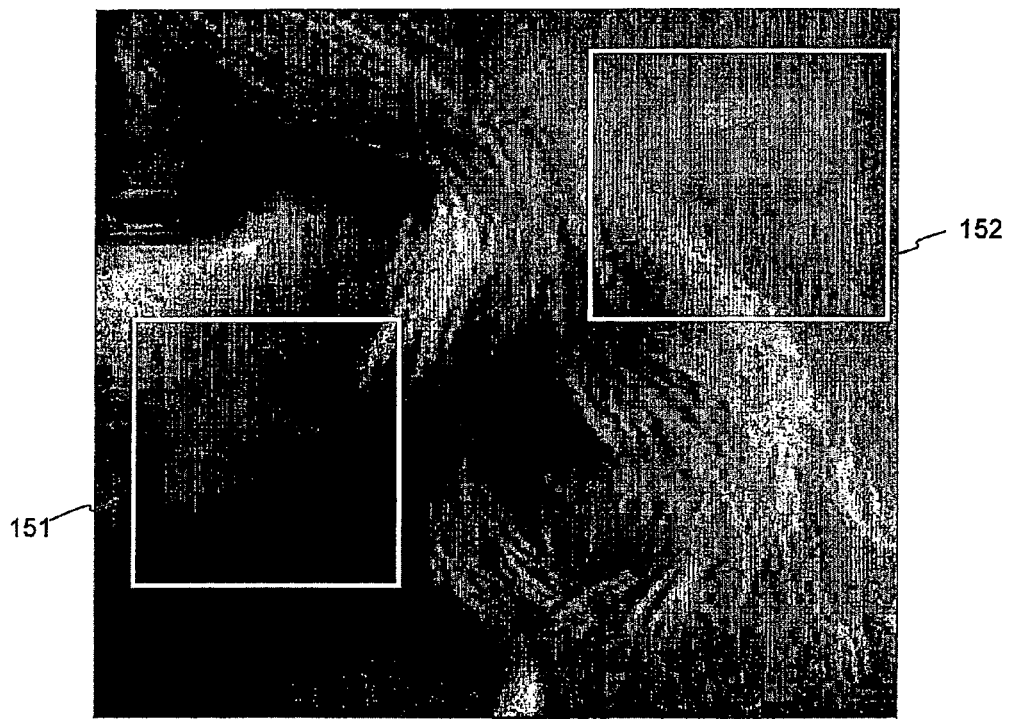
Figure 16A:
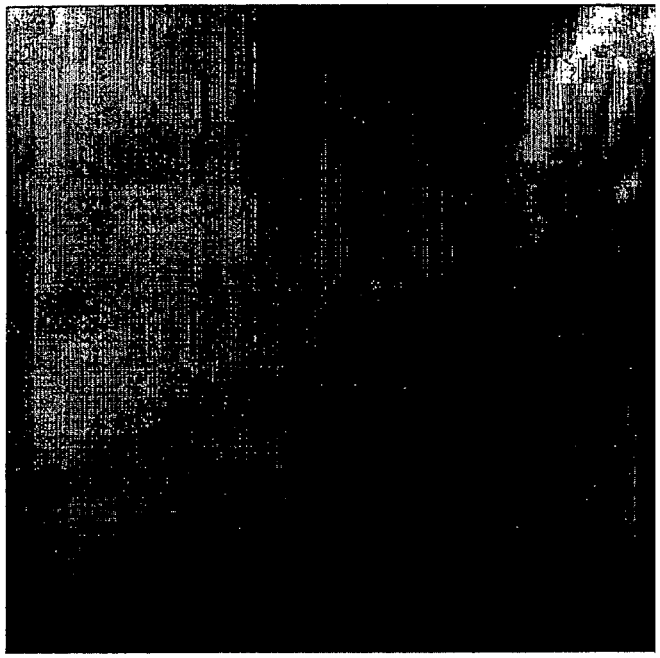
Figure 16B:
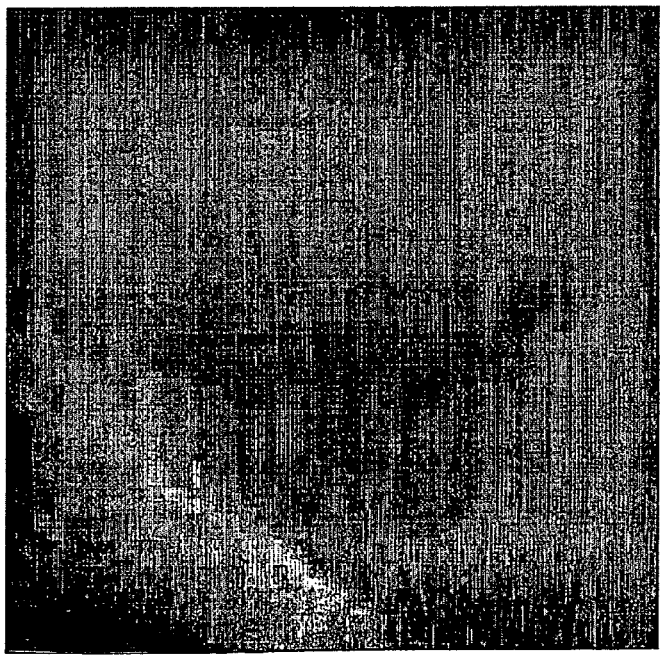
Figure 17A:
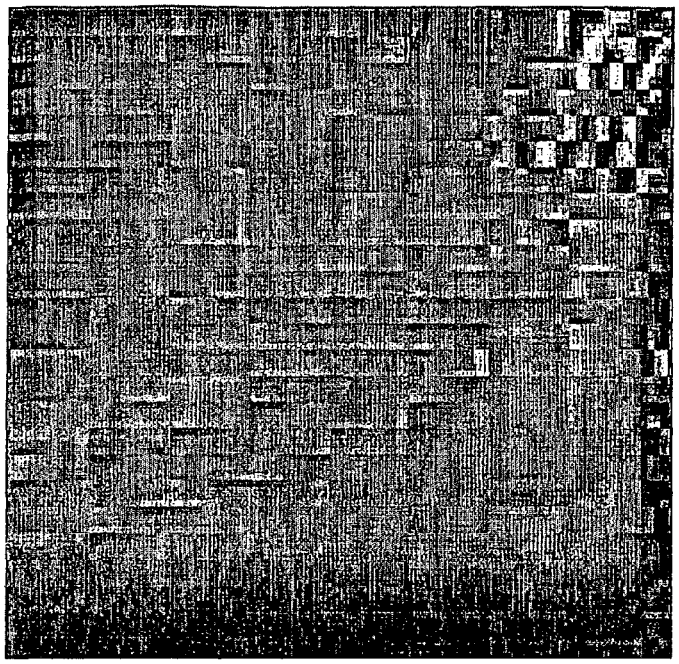
Figure 17B:
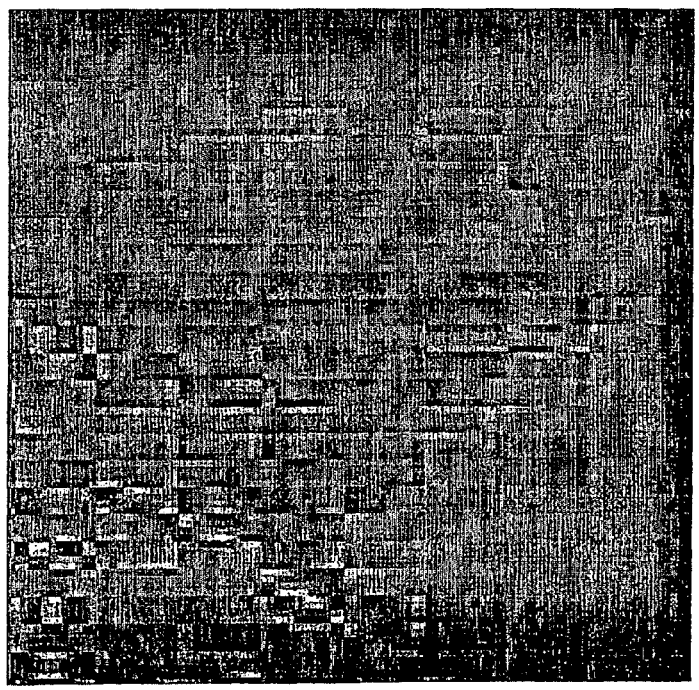
Figure 18A:
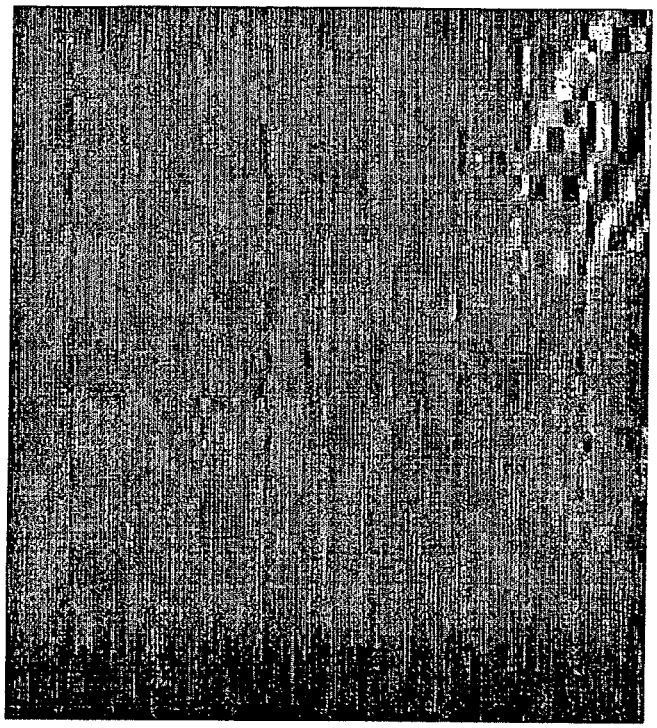
Figure 18B:
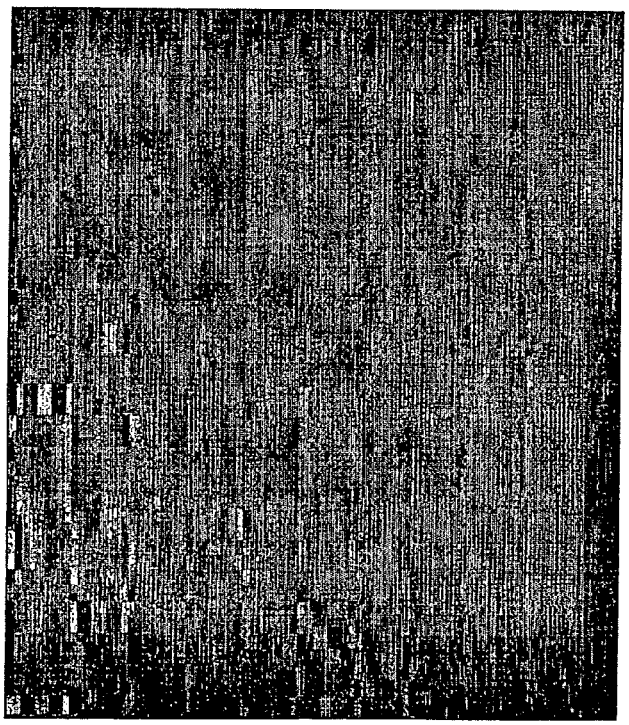
Figure 19A:
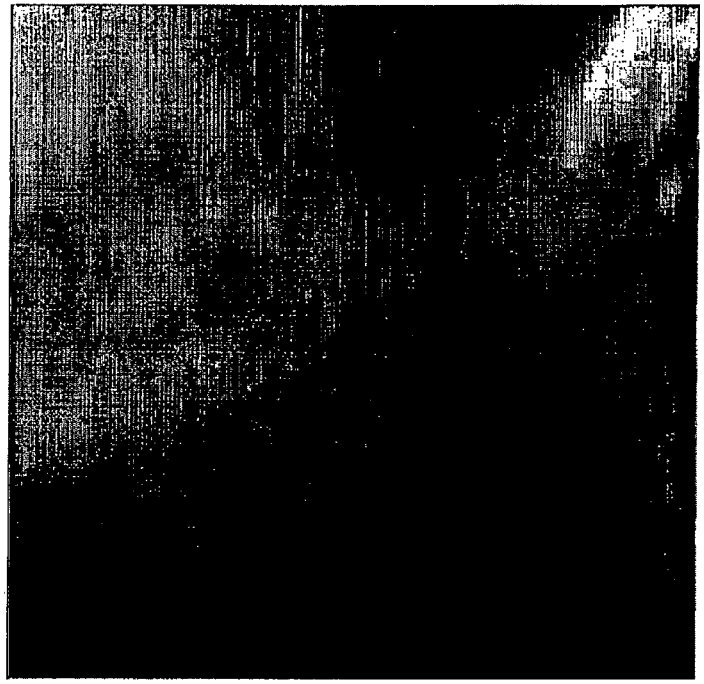
Figure 19B:
Figure 20A:
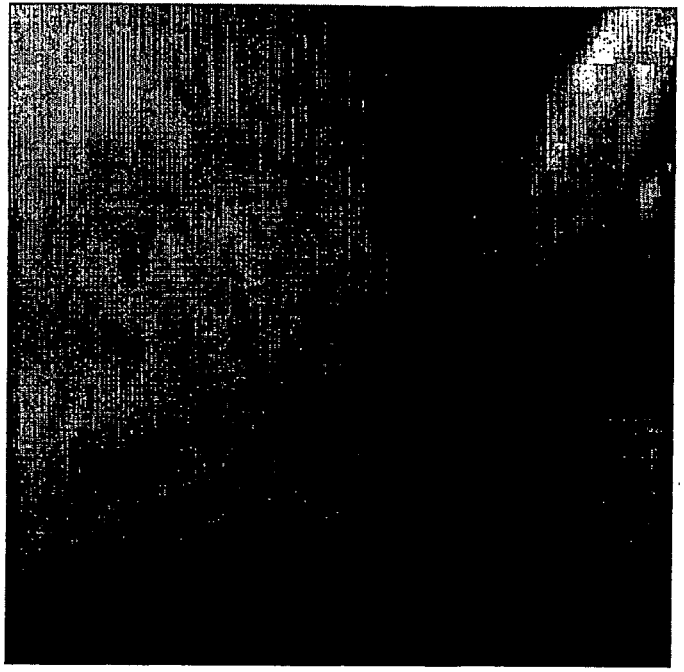
Figure 20B:
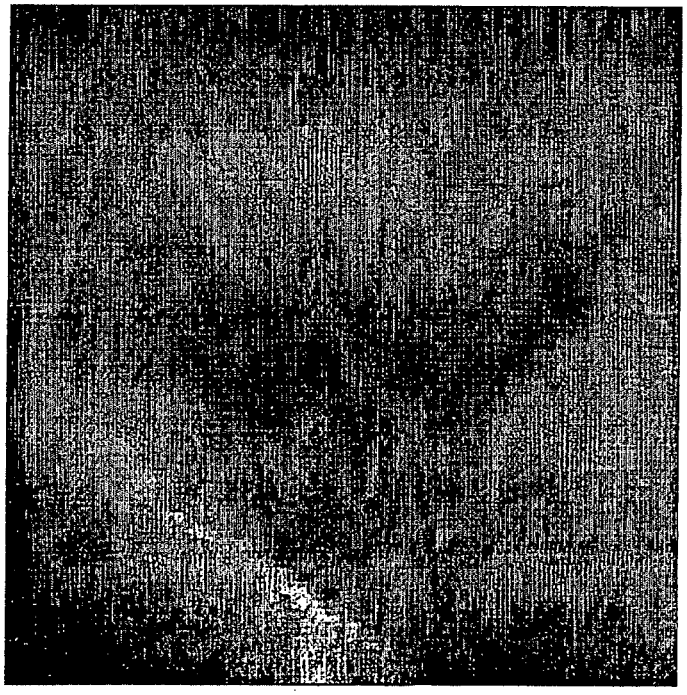
Figure 21A:
Figure 21B:

FIG. 13*a* is a graph representing an ideal edge in the transform domain;

FIG. 13*b* is a graph representing an up-sampled edge;

FIG. 14 is a schematic diagram of an system according to the invention for removal of blocking artefacts using a Laplacian of Gaussian filter with separated data sets with a down sampler and an up sampler;

FIG. 15 is a source image with blocking artefacts;

FIGS. 16*a* and 16*b* are magnified portions from the source image of FIG. 15;

FIGS. 17*a* and 17*b* are composites of data sets $h_1$ & $h_2$ transform domain signals of the magnified portions of FIGS. 16*a* and 16*b* respectively;

FIGS. 18*a* and 18*b* are the data sets of FIGS. 17*a* and 17*b* horizontally down sampled;

FIGS. 19*a* and 19*b* are the resultant corrected magnified portions of FIGS. 16*a* and 16*b* as produced with the system of FIG. 2;

FIGS. 20*a* and 20*b* shows a resultant magnified image portions of FIGS. 16*a* and 16*b* corrected with the system of FIG. 14;

FIG. 21*a* shows the source image of FIG. 15 corrected with the system of FIG. 2; and FIG. 21*b* shows the source image of FIG. 15 corrected with the system of FIG. 14.

In the Figures like reference numerals denote like parts.

FIG. 2 shows an embodiment 200 of the system of the invention in a basic form.

The system comprises in series an edge detector function 21, having an input 20 and an output 22 to a detail discrimination function 23 having an output 24 to a transformation function 25. An output 26 of the transformation function 25 and a delayed version 27 of a video signal input at the input 20 are both input to a subtract/add function 28 having an output 29.

Video information with block artefacts enters the system at the input 20 and is processed with the edge detector function 21. This can be implemented by one of a number of known methods such as, for example, Sobel, Kirsch or pseudo Laplace.

The output of the edge detector function 21 is a false image map 22 showing all the edges in the image. This 'edge map' will have different attributes dependent upon the algorithm chosen for the edge detector function 21, but will in general contain information on the block edges as well as variation in the original image from the content of the picture.

A post-processed version of the edge map 24 is passed to the transforming function 25 where the information contained is transformed into a correction signal 26. This signal 26 is then subtracted from, or added to, a delayed version 27 of the original video signal applied at input 20, which has been subjected to an appropriate video delay by a delay device (not shown) by an adder/subtractor 28. The output 29 of the subtract/add function 28 is a corrected, de-blocked video signal.

The purpose of the detail discrimination function 23 is to attenuate or remove image detail edges in the data stream 22 and the nature and function of the detail discriminator depends on a representation of each form of edge in the data stream 22, which varies according to the implementation of the edge detector function 21.

Again, a form and function of the transformation function 25 is governed by the representation of edges in the data stream 24 output from the detail discrimination function 23.

It is advantageous that an edge detector function 21 is chosen from the available methods with the following properties. Firstly it should be immune, as far as possible, to noise in the source image since this could cause edges to be erroneously detected all over the field of data. Secondly the function should represent the position of the edge unambiguously and with some degree of precision. Thirdly the function should be easy to implement in that the number of calculations and the form of the mathematics should be able to be implemented in either software or hardware at a needed data rate. Finally it is advantageous if the output 22 of the edge detector 21 is output to separate data streams for horizontal and vertical edge information. This separation of information makes easier postprocessing of the data 24 output from the detail discrimination function the edge detector sub-system The Edge Detector Sub-System There are a number of candidates from the available choices that fit these requirements. For simplicity only one of these, the Laplacian of Gaussian filter, is considered herein.

The Laplacian of Gaussian function, or LoG Filter, combines a two-dimensional second derivation of the surface function with a noise reducing smoothing by a Gaussian low-pass filter. A zero crossing in a final convolution result represents edge pels.

If f(x,y) is an incoming image, k is a window size and h(x,y) is an outgoing edge map then the two stage convolution is shown in equation 1.

The LoG function $$u_1(x, y) = \sum_{i=-k}^{k} f(x+i, y) \cdot c_1(\text{abs}(i))$$

$$u_2(x, y) = \sum_{i=-k}^{k} f(x+i, y) \cdot c_2(\text{abs}(i))$$

$$h_1(x, y) = \sum_{j=-k}^{k} u_1(x, y+j) \cdot c_2(\text{abs}(j))$$

$$h_2(x, y) = \sum_{j=-k}^{k} u_2(x, y+j) \cdot c_1(\text{abs}(j))$$

$$h(x, y) = h_1(x, y) + h_2(x, y)$$

Equation 1 where the coefficient sets $c_1$ and $c_2$ are the Laplacian and Gaussian coefficients and satisfy the conditions set out in equation 2.

The coefficient set conditions $$C_1 = \sum_{t=-k}^{k} c_1(t) = 0$$

$$C_2 = \sum_{t=-k}^{k} c_2(t) = 1$$

Equation 2

Equations 3 & 4 show derivations of the $c_1$ and $c_2$ sets. In both cases $\sigma^2$ denotes the Gaussian kernel size, i.e. the window size.

Derivation of the coefficient set $c_1$ $$C_1(i, j) = \left(2 - \frac{i^2 + j^2}{\sigma^2}\right) \cdot e^{\left[-\frac{i^2+j^2}{2\sigma^2}\right]} \quad \text{Equation 3}$$

Derivation of the coefficient set $c_2$ $$C_2(i, j) = e^{\left[-\frac{i^2+j^2}{2\sigma^2}\right]} \quad \text{Equation 4}$$

When using the LoG filter it is advantageous to use intermediary vertical and horizontal data sets $h_1$ and $h_2$ since post-processing of separated vertical and horizontal sets is less complex than working on a merged data set h.

Figure 3:
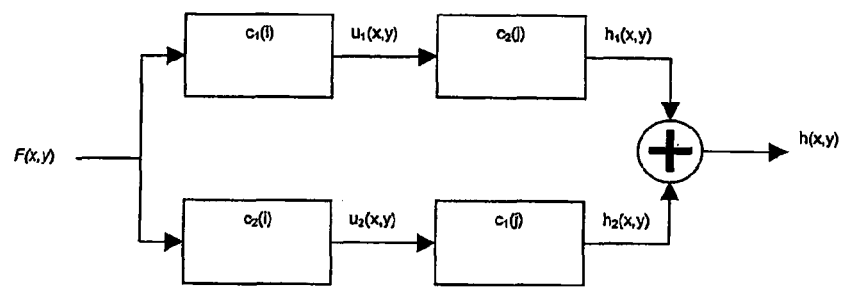
FIG. 3 is logical scheme of data flow in a Laplacian of Gaussian (LoG) filter with merged output suitable for use in the invention.
Figure 4:
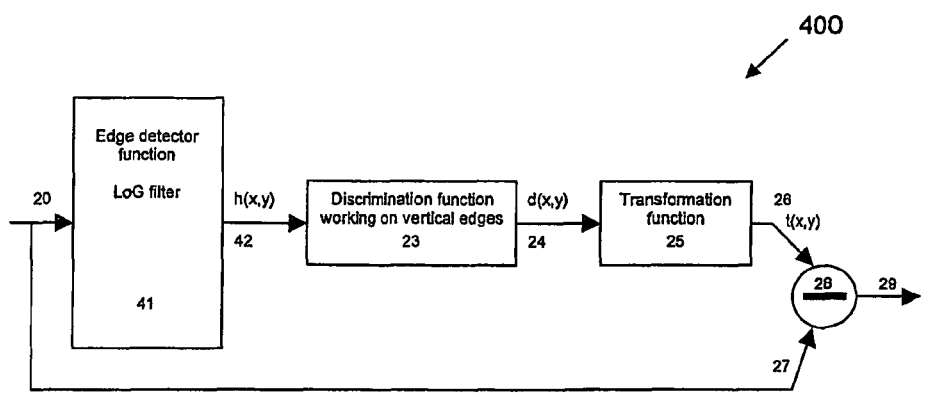
FIG. 4 is a schematic diagram of the system of FIG. 2 using the LoG filter of FIG. 3.

A system 400 employing the LoG filter is shown in FIG. 4 with a edge detector function 41 embodied as a LoG filter. A data set 42 output from the LoG filter 41 is now h(x,y) from the LoG output as illustrated in FIG. 3. Output 24 from the discrimination function 23 is now labelled d(x,y) to clarify the discriminator functions below.

In the embodiment of FIG. 4, the edge discrimination function 23 is still working on a two dimensional, or merged, data set. This can be a disadvantage as the merged data set makes the discrimination task more complex, with more cases to consider. Since the separated data sets are available within the LoG algorithm it is advantageous to employ them.

FIG. 5 shows a modified system 500 with the internal data sets, $h_1$ and $h_2$ employed. FIG. 5 shows the LoG filter outputs 51, 52 as two data sets, $h_1$ and $h_2$, where $h_1$ contains information on the vertical edges, and $h_2$ the horizontal edges.

The system 500 illustrated in FIG. 5 has two parallel discrimination functions 53, 54, a first discrimination function 53 working on a first sub-set of data $h_1(x,y)$ representing vertical edges and a second discrimination function 54 working on a second sub-set of data $h_2(x,y)$ representing horizontal edges. The post-processed respective output data sets 55, 56 are transformed into respective correction signals by two parallel transformation functions 57, 58, which may be identical to each other, or may vary in operation in order to apply different responses to horizontal and vertical block edges.

The respective data sets $t_1(x,y)$, $t_2(x,y)$ output 591, 592 from the transformation functions 57, 58 contain separated correction data for the horizontal and vertical data sets respectively, which are summated to form an output 593 which is a complete correction set t(x,y).

A subtractor 28 is used, as in the system 200 illustrated in FIG. 2, to apply the correction set t(x,y) to the delayed video signal 27 to form the output 29 of the system 500.

The Discriminator Sub-System

There are many methods available to implement the block edge/image detail discriminator 23; 53, 54.

One method that complements the system shown in FIG. 4 is a local DC removal technique. This technique is based on the premise that much of the image detail is of lower spatial frequency than the block edges. The method involves calculating a localised mean of levels and subtracting the localised mean from the pel under operation.

Discrimination by localised DC removal $$k = \frac{n-1}{2} \quad \text{Equation 5}$$

$$d(x, y) = h(x, y) - \sum_{j=-k}^{k}\sum_{i=-k}^{k} h(x+i, y+j)$$

Figure 6A:
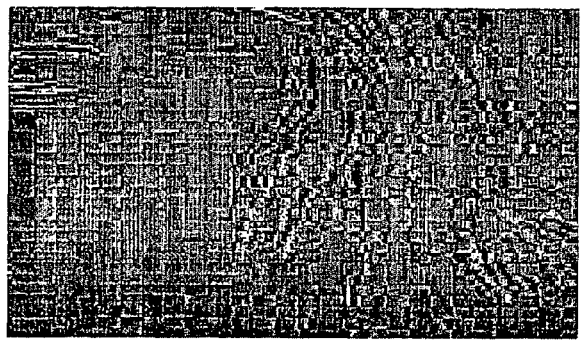
FIGS. 6a and 6b are representations of data sets h(x,y) and d(x,y) of FIG. 4 with discrimination by localised DC removal.
Figure 6B:
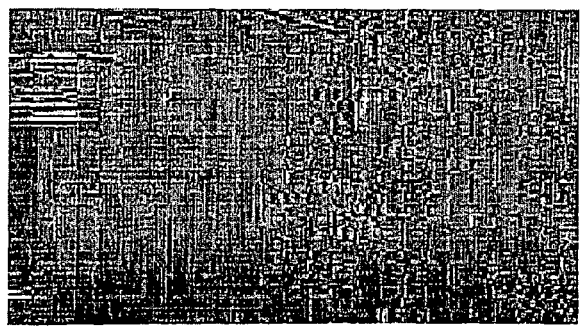

FIGS. 6a and 6b are representations of data sets h(x,y) and d(x,y) before and after discrimination by localised DC removal, respectively. Thus FIGS. 6a and 6b show false image maps that diagrammatically represent data sets h(x,y) and d(x,y). The image of FIG. 6a shows output h(x,y) of the LoG filter and shows both block edges and image detail. The image of FIG. 6b shows the data set d(x,y) with n=3 and the reduction in picture detail and enhancement of block edges can be seen.

An alternative discriminator function is a non-linear orthogonal correlation function shown in equation 6. With this technique an assessment of the information is made at a point of operation as to the likelihood that the information represents an edge that may be a block edge. This is then correlated orthogonally to confirm a matching profile.

Discrimination by non-linear orthogonal correlation $$d_1(x, y) = 0 \mid \text{Sum\_A} < N \ \& \ \text{Sum\_B} < N \quad \text{Equation 6}$$
$$d_1(x, y) = h_1(x, y) \ \text{elsewhere}$$
$$k = \frac{n-1}{2}$$
$$\text{Sum\_A} = \sum_{j=-k}^{k} s[h_1(x, y+j), h_2(x+1, y+j)]$$
$$\text{Sum\_B} = \sum_{j=-k}^{k} s[h_1(x-1, y+j), h_2(x, y+j)]$$
$$s[a, b] = \left\{\begin{matrix} 1 \mid s \leq 0 \\ 0 \mid s > 0 \end{matrix}\right\}$$
where
$$s(a, b) = \left[\sqrt{(a+b)^2} - \frac{\sqrt{a^2+b^2}}{m}\right]$$

Where n is the correlation range, N is the degree of correlating occurrences in n and m is the margin of correlation.

Figure 7A:
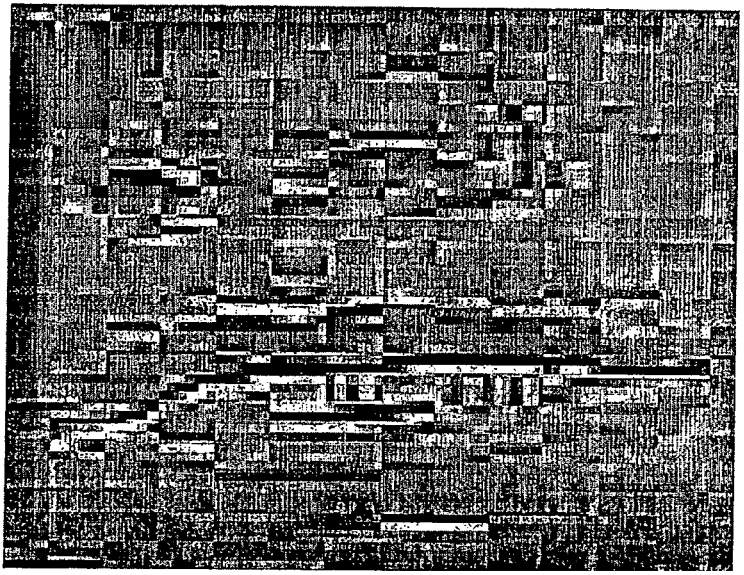
FIGS. 7a and 7b are representations of data sets h(x,y) and d(x,y) of FIG. 4 with discrimination by orthogonal correlation.
Figure 7B:
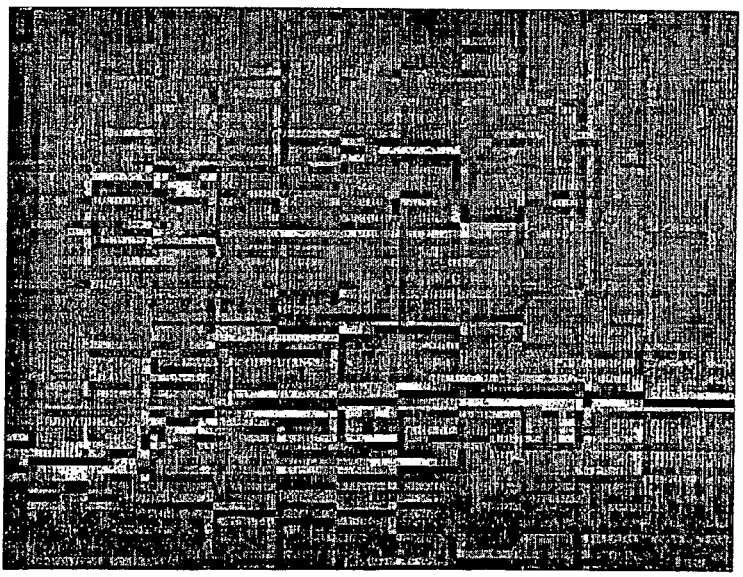

FIGS. 7a and 7b show representations of data sets h(x,y) and d(x,y) before and after discrimination by such orthogonal correlation, respectively.

Finally, if the edge detection function used is the LoG filter then the centre of an edge can be identified by a zero crossing in the transform domain. This means that each point in the edge map can be assessed as to the profile of the pulse and the orthogonal coherence of the zero crossing point.

Example pseudo code for this is as follows.

```
FOR y = 0 TO Y_MAX
  FOR x = 0 TO X_MAX-1
    If( Pulse_Profile( h_g(x,y), h_g(x+1,y) ) >
Profile_Threshold )
      Current_Zero_Crossing_Point = Assess_ZC_Point(
h_g(x,y), h_g(x+1,y) )
      FOR z = +cr TO -cr
        IF((Assess_ZC_Point( h_g(x,y+z), h_g(x+1,y+z) )
        - Current_Zero_Crossing_Point) >
Crossing_Threshold )
          Other_ZC_Points[z] = 1
        ELSE
          Other_ZC_Points[z] = 0
      IF( Assess_Other_ZC_Points(Other_ZC_Points) = 1 )
        D_g(x,y) = h_g(x,y)
      ELSE
        D_g(x,y) = 0
```

Where:

the function Pulse_Profile returns a fractional value representing a correlation of the information at a current point of operation to a profile of an ideal edge in the transform domain;

the function Assess_ZC_Point returns a fractional value to indicate a position of a matched zero crossing relative to the current point of operation;

the function Assess_Other_ZC_Points returns a Boolean decision as to whether an appropriate group of samples show correlation of a matching edge. This involves assessing sample information orthogonally from the point of operation over an appropriate range, CR, and filtering the decision on a threshold of matches adjacent to the sample under operation. This becomes increasingly important as CR rises; and the function Pulse_Profile could take the form of the following equation.

Possible form for the assessment of edges $$\text{Score} = e^{\left[1 - M\left(\frac{\sqrt{a^2+b^2}}{2\left(\sqrt{(a+b)^2} + \left(\frac{\sqrt{a^2+b^2}}{2}\right)\right)}\right)\right]} \quad \text{Equation 7}$$

Where M is a constant.

The function Assess_ZC_Point could take the form shown in Equation 8. This holds while the pulse profile returns a high value and the sample pair forms a bipolar relationship.

Possible form for the assessment of zero crossing $$\text{Zero\_Crossing} = \left[\frac{-\left(\frac{a+b}{2}\right)}{b-a}\right] + 0.5 \quad \text{Equation 8}$$

Where a and b are samples under operation.

Edge detection and discrimination methods can be unreliable in that real edges can occasionally be confused with those resulting from block boundaries and so any means of discriminating between these alternatives is valuable. A method of limiting the unwanted artefacts by measuring and processing statistics from the image has been found and this has lead to an automation of the system that adjusts to the image content and degree of impairment. This limits the artefacts induced by this process.

By examining a size of the transition across known block edges, a distribution of occurrence can be generated and used to set a limit for the whole image as to the statistical size of the impairment step.

Once this frequency of occurrence of a given step size has been measured a limit can be established for the main de-blocking algorithm whereby a correction surface is not generated even if the profile and edge coherence metrics are met.

Figure 8:
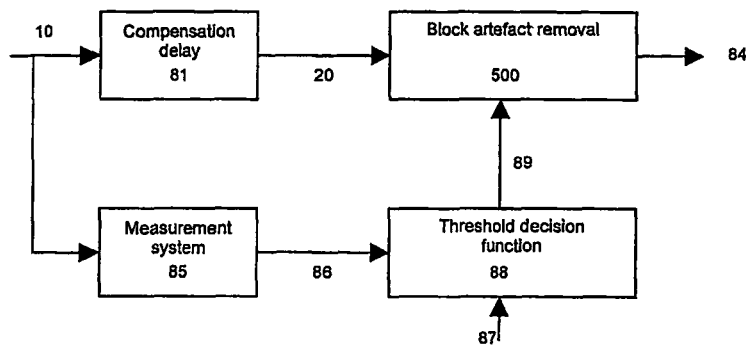
FIG. 8 is a schematic diagram of an exemplary embodiment of a system according to the invention.

FIG. 8 shows an exemplary embodiment of a system according to the invention. When processing an image in a computer system the measurement can be made on the image immediately before it is processed. In a physical implementation part or the entire image must undergo examination before the de-blocking algorithm can be provided with a meaningful threshold. For this reason FIG. 8 shows a measurement system 85, 88, an image delay element 81 and a de-blocking system 500 as illustrated in FIG. 5.

In FIG. 8, a video signal with block artefacts enters at input 10. A measurement system 85 measures a size of block edge transitions over the image or some section of it. This statistical information 86 is passed to threshold decision logic 88 that analyses the edge transition size and decides on a threshold of step size above which an edge will be ignored. Output 89 from the threshold decision function 88 is passed to the previously described de-blocking system 500, which is illustrated in FIG. 5. Processed video 84 leaves the system which is equivalent to output 29 in FIG. 5. The input 10 of FIG. 8 is equivalent to the input 20 in FIG. 5. The compensating delay 81 is used to ensure that the image output to the block artefact removal function 500 is co-timed with the output 89 of the decision of threshold decision function 88.

An optional input 87 to the threshold decision function 88 can be used to control or bias the decision-making process of the threshold decision function 88.

Figure 9:
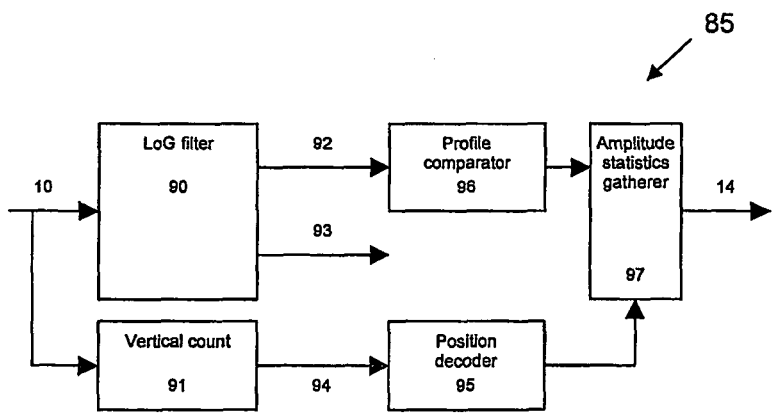
FIG. 9 is a schematic diagram of detail of the measurement system of the system of FIG. 8.

FIG. 9 shows the detail of the measurement system block 85 of the system illustrated in FIG. 8.

In FIG. 9 a Laplacian of Gaussian filter 90 is used in a similar fashion to the de-blocking filter used in the edge detection function 41. The two outputs of the filter, the horizontal edges 92 and the vertical information 93 are output. The vertical edges 93 are discarded as unneeded but the horizontal edges 92 are examined in a similar fashion to the de-blocking filter; this is because the vertical edges are extremely difficult to discern especially when the video has been interpolated in a previous stage. Horizontal edges are more stable due to their dependence on the video line structure and are thus more reliably found.

Vertical count block 91 counts the lines of video as they pass through the system. This count 94 is passed to a position decoder 95, which outputs to amplitude statistics gatherer block 97 points in the image when a block edge might be expected to form based on the block size of the image compression algorithm.

Figure 10:
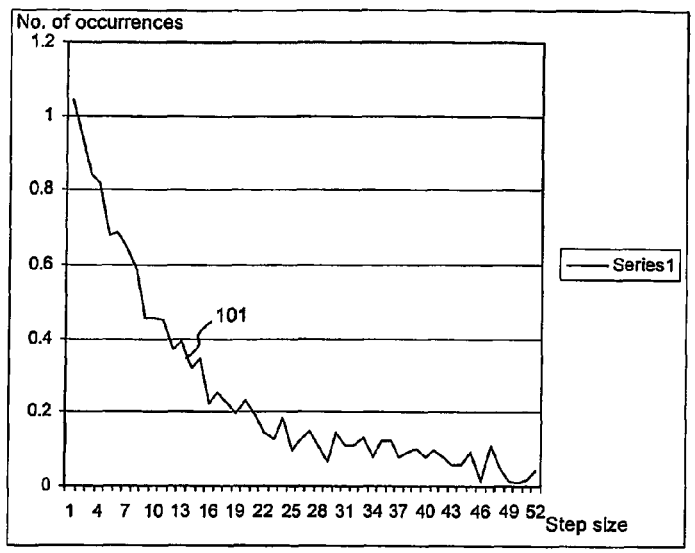
FIG. 10 is a graphic representation of block step size information gathered in the measurement system of FIG. 9

Amplitude statistics gatherer block 97 receives the input from block 95 and if profile comparator block 96 indicates a presence of an edge at that position, then the amplitude of that edge is recorded, for example in a frequency of occurrence graph as shown in FIG. 10.

This process gives a distribution of the measured amplitude of block edges in the image by filtering to spatial positions where edges will commonly occur and confirming their presence by metrics that profile the edges.

Only horizontal edges are sought in this system. This is because the positions of the edges are more predictable since there is usually no issue of sub-sampling for encoding in the vertical direction.

Once a significant sample set has been accrued the contents of the amplitude distribution can be processed. This period may be over the entire image or may be segmented to sub-regions of the image to allow variation within each image. The assessment of these statistics aims to set a cutoff point of amplitude whereby large edges are assumed to belong to image content and are therefore preserved in de-blocking. FIG. 10 shows an example of how this information may be represented graphically.

FIG. 10 is a graph showing a line 101 depicting a typical data set from the system. The horizontal axis maps the size of the step and the vertical axis represents the number of occurrences of that size in this image. The axes labels and numbering are arbitrary in this example.

In most compressed images the amplitude of the block edges is predominantly small, leading to a higher curve on the left hand side. Although large block edges can occur, in most images peaks on the right hand side of the curve are caused by image content and detail that has wrongly been identified as block edges.

This information can be processed by means such as smoothing, low pass filtering or curve matching and an upper threshold established for the step size of the blocks.

The Transformation Function Sub-System

The function of the transformation function block 25; 57, 58 is to transform a map 24; 55, 56 of block edges into a correction signal t(x,y). The action of this module will vary according to the edge detector algorithm used, since the transform must match the format of data the edge detector outputs.

If the LoG filter is used then the following algorithm is suitable for the transformation.

Working on the separated data sets, $d_1$ and $d_2$, the nearest significant profile that indicates a block edge transition is found. When found, the level of the sample under operation is changed to a value proportional to the size of the transition and the distance from that edge. FIG. 11 demonstrates an example result of such a process. That is, FIGS. 11*a* and 11*b* show representations of data sets d(x,y) and t(x,y) from FIG. 5, respectively.

The image of FIG. 11*a* shows a sample block, identified in the post-processed data set d(x,y). This false image map shows block edges around almost all of the four sides of the block represented by a deviation from mid grey, (which represents zero).

Referring to FIG. 11*b*, after processing the correction data map t(x,y) shows a gradient of intensity falling from top left 111 to top right 112 and from top left 111 to bottom left 113. This implies that the top left portion of this block will be darkened in the corrected image and the right side will be lightened. Since the bottom left is mid grey then little or no correction will be applied here.

Hence the incoming video has the local flattened surface tilted in two dimensions to conceal the block edges. Referring back to FIG. 1 if this process is applied to a two-dimensional graph the corrected image is modified from that represented in FIG. 12*a*, which shows a representation of the data from FIG. 1 to a version in FIG. 12*b* of the same data with the proposed correction applied.

In summary, the invention has the advantages of removing blocking artefacts without requiring knowledge of the quantiser scale code, nor does it rely on an assumption that block edges are only present on a fixed grid. Further there are no complex thresholds that require optimisation for the source material.

One issue with broadcast feeds is that an image is frequently encoded in the compression domain with a horizontal resolution lower than the display resolution. This is done as a further bit-saving measure as the reduced horizontal bandwidth contains less information to be encoded.

While block edges still exist in the sub-sampled domain, when they are up-sampled to the original resolution for display the edge becomes more diffuse and less well defined.

Referring to FIG. 5, a clean edge $h_1(x,y)$, $h_2(x,y)$ in the transform domain, at outputs 51 & 52, would be represented by a symmetrical bi-polar pulse as shown in graph 31 of FIG. 13*a*. An edge that has been up-sampled for display produces a pattern similar to the graph 32 of FIG. 13*b*. Instead of a clean bi-polar pulse, ringing and distortion can be seen.

This leads to two issues with the de-blocking system in FIG. 5, first it is more difficult reliably to recognise an edge which is distorted and secondly it is difficult to create a matching correction signal to compensate and conceal the distorted edge. Widening the matching case when looking for edges can compensate for the first of these problems. However, this has a disadvantage that more picture data will be incorrectly identified as block edges, which in turn leads to more artefacts being induced in the output. The second issue is more difficult to compensate for.

Referring to FIG. 14, there is illustrated an enhancement to the system of FIG. 5, in which the transform domain signal $h_1(x,y)$ from the Laplacian of Gaussian filter 41 that contains information on the vertical edges i.e. edges encountered while traversing the image horizontally, is down sampled by an image horizontal down-sampler 141 from a display resolution to a previous encoded resolution (PER) used by a compression system preceding this system.

This has the effect of sharpening the transform domain representation of block edges and allows their detection using the same metrics as full resolution vertical and horizontal edges without compromising a matching stringency.

Thus, referring to FIG. 14, a sub-sampled transform domain 411 output from the image horizontal down-sampler 141 is passed to a discriminator 221 as in FIG. 5 and the transformation of the discriminated signal by the transformation function 231 to form data set 245 proceeds. Once this signal is prepared an up-sampler 142 turns the lower resolution correction signal into a full resolution signal $t_1(x,y)$ which now contains a correction signal suitable for application to a delayed video signal 27 which is derived by passing the video signal at input 20 through a video delay 201.

In order to demonstrate the problem and the effectiveness of the proposed system a number of images are presented by way of example.

In order to process the image appropriately the previous encoded resolution, PER 125 is input to the image horizontal down-sampler 141 and the image horizontal up-sampler 142. The PER is a horizontal resolution used in the proceeding MPEG encoding process that caused the blocking artefacts under operation.

FIG. 15 shows an example image suitable for processing with a de-blocking system. The highlighted areas 151, 152 show from where magnified example areas in FIGS. 16*a* and 16*b* are taken, respectively.

The image of FIG. 15 has suffered blocking artefacts by being MPEG-encoded at a moderately high level of quantisation. The display resolution of the image is 720 pels wide but when the image was MPEG-encoded this resolution was reduced to 544 pels to save bit rate.

FIGS. 16*a* and 16*b* show two sections of the image highlighted in FIG. 15 magnified for clarity and both clearly show blocking artefacts to be removed.

FIGS. 17*a* and 17*b* show the two magnified sections of the image of FIGS. 16*a* and 16*b* after being transformed by the Laplacian of Gaussian operator. The transform domain has been represented here as a false image map by lifting the zero value to mid grey. Hence a negative deviation is represented by a darker pel and a positive deviation by a brighter than mid grey value.

The data sets $h_1$ & $h_2$ have been composted in these images to compare and contrast the horizontal and sub-sampled vertical edges.

In both the false image maps of FIGS. 17a and 17b horizontal edges can be seen to be clean, bi-polar pulses, as represented by a run of mid grey pels followed by a darker then proportionally lighter pel before returning to mid grey.

The vertical edges show a more complex, less well-defined shape as exemplified in the graph of FIG. 13b. These edges often show an indeterminate rate of rise and fall without a focused centre point.

FIGS. 18a and 18b show data sets from the output 411 of the image horizontal down-sampler 141 of FIG. 14. Here the data set containing the vertical edge information has been down sampled to 544 pels. The false image maps shown are similar to those from FIGS. 17a and 17b but for clarity the information for the horizontal edges has been omitted, leaving only the vertical edges of interest.

The representations of the edges in FIGS. 18a and 18b have sharpened and become far more symmetrical bi-polar pulses. This greatly aids the discrimination stage 221 and the transformation stage 231 of the apparatus illustrated in FIG. 4.

FIGS. 19a and 19b show the areas under consideration after processing with the system of FIG. 5. This data comes from the output 29, i.e. without the enhancement to the system illustrated in FIG. 14. Not all of the block edges have been concealed and that a residual of all the block edges has remained despite the processing.

FIGS. 20a and 20b show resultant corrected image portions at output 28 in FIG. 14. These images have been processed by the enhanced system and show a significant improvement in the performance of the block edge concealment. That is, FIGS. 20a and 20b show a substantially higher rate of block edge recognition and concealment thanks to the enhanced system of FIG. 14.

This is shown over a larger portion of the image in FIGS. 21a and 21b where the image of FIG. 21a is that from output 29 of the system of FIG. 5 and does not benefit from the enhancement. The image of FIG. 21b is from output 28 of the system shown in FIG. 14 and benefits from the enhancement.

It can be seen that the enhanced system recognises and conceals more block edges that the basic system.

The invention claimed is:

1. An apparatus for reducing blocking artifacts in a decompressed image signal comprising:
    a video signal input;
    a delay function connected to the video signal input;
    a block edge and image content edge detector function, comprising an edge detector function, connected to the video signal input in parallel to the delay function;
    an image content edge and block edge discrimination function connected to an output of the block edge and image content edge detector function; and
    a block edge concealing function connected to outputs of the delay function and the image content edge and block edge discrimination function.

2. The apparatus of claim 1 wherein the edge detector function comprises one of a Sodel function, a Kirsch function, and a pseudo-Laplace function.

3. The apparatus of claim 1 wherein the block edge and image content edge detector function comprises a Laplacian of Gaussian filter.

4. The apparatus of claim 1 wherein the image content edge and block edge discrimination function comprises a discrimination function configured to remove or attenuate the image content edges.

5. The apparatus of claim 1 wherein the image content edge and block edge discrimination function comprises a discrimination function configured to remove a local DC signal from a transform domain signal.

6. The apparatus of claim 1 wherein the image content edge and block edge discrimination function comprises a discrimination function configured to perform non-linear orthogonal correlation.

7. The apparatus of claim 1 wherein the image content edge and block edge discrimination function comprises a discrimination function configured to separately discriminate between vertical and horizontal image content edges, and vertical and horizontal block edges.

8. The apparatus of claim 1 wherein the block edge concealing function comprises a function configured to:
    locate a nearest profile to a picture element (pel) indicating a block edge transition;
    change a value of the pel proportionally to a size of the transition and a distance of the pel from the transition to produce an error correcting signal; and
    an adder to add the error correcting signal to a delayed version of the decompressed video signal output from the delay function.

9. The apparatus of claim 1 further comprising a pre-processing stage configured to:
    determine an average size of block edge transitions in an image;
    determine, from the average size, a threshold size of transition above which edges are not removed; and
    output a corresponding threshold signal.

10. The apparatus of claim 9 wherein the pre-processing stage is further configured to determine sizes of block edge transitions over at least one portion of an image.

11. The apparatus of claim 9 further comprising a Laplacian of Gaussian filter to detect horizontal edges.

12. The apparatus of claim 9 further comprising a counter configured to count lines of a video image to determine locations where blocking edges may be expected from a known blocking size, and to determine sizes of edge transitions only at those locations.

13. The apparatus of claim 1 wherein the block edge and image content edge detector function comprises a function configured to separately detect horizontal and vertical edges.

14. The apparatus of claim 13 further comprising:
    the block edge and image content edge detector function being further configured to output a vertical edge location signal and a horizontal edge location signal;
    an image horizontal down-sampler function configured to receive and to down-sample the vertical edge location signal using a previously encoded resolution of the decompressed image signal;
    the image content edge and block edge discrimination function comprising an image and block vertical edge discrimination function connected to an output of the down-sampler function, and configured to remove or conceal the vertical image edges;
    a vertical edge transformation function configured to locate a nearest profile to a pel indicating a block vertical edge transition, and determine a vertical edge error correcting signal for changing a value of the pel proportional to a size of the transition and a distance of the pel from the transition;

an image horizontal up-sampler function connected to an output of the vertical edge transformation function, and configured to up-sample the vertical edge error correcting signal;

the image content edge and block edge discrimination function further comprising an image content and block horizontal edge discrimination function connected to an output of the block edge and image content edge detector function, and configured receive the horizontal edge location signal and to delete or conceal the horizontal image edges;

a horizontal edge transformation function configured to locate a nearest profile to a pel indicating a block horizontal edge transition, and determine a horizontal edge error correcting signal for changing a value of the pel proportionally to a size of the transition and a distance of the pel from the transition;

an adder function configured to add the up-sampled vertical error correcting signal and the horizontal edge error correcting signal to form a combined error correcting signal; and a subtractor function configured to subtract the combined error correcting signal from a delayed version of the decompressed video signal output from the delay function.

15. A method of reducing blocking artifacts in an image compression system comprising the steps of:
inputting a video signal;
performing a preprocessing step of:
determining an average size of block edge transitions in an image; and
determining, from the average size, a threshold size of transition above which edges are not removed;
detecting block and image content edges using an edge detector function;
discriminating between image content edges and block edges; and
concealing the block edges.

16. The method of claim 15 wherein the edge detector function comprises one of a Sodel function, a Kirsch function, and pseudo-Laplace function.

17. The method of claim 15 wherein the edge detector function comprises a Laplacian of Gaussian filter.

18. The method of claim 15 wherein the step of discriminating between image content edges and block edges comprises removing or concealing the image content edges.

19. The method of claim 15 wherein the step of discriminating between image content edges and block edges comprises removing a local DC signal from a transform domain signal.

20. The method of claim 15 wherein the step of discriminating between image content edges and block edges comprises non-linear orthogonal correlation.

21. The method of claim 15 wherein the step of discriminating between image content edges and block edges comprises separately discriminating between vertical and horizontal edges.

22. The method of claim 15 further comprising smoothing the block images by locating a nearest profile to a pel indicating a block edge transition, and changing a value of the pel proportionally to a size of the transition and a distance of the pel from the transition.

23. The method of claim 15 wherein determining an average size of block edge transitions comprises determining sizes of block edge transitions over at least one portion of an image.

24. The method of claim 15 further comprising using a Laplacian of Gaussian filter to detect horizontal edges.

25. The method of claim 15 further comprising:
counting lines of a video image to determine locations where blocking edges may be expected from a known blocking size; and
determining sizes of block edge transitions only at those locations.

26. The method of claim 15 wherein the step of detecting block and image content edges comprises separately detecting horizontal and vertical edges.

27. The method of claim 26 further comprising:
detecting locations of vertical and horizontal block and image edges, and generating a vertical edge location signal and a horizontal edge location signal;
down-sampling the vertical edge location signal using a previously encoded resolution of the video signal;
discriminating between vertical image edges and vertical block edges using the down sampled signal to form a vertical edge correcting signal;
up-sampling the vertical edge correcting signal using the previously encoded resolution of the video signal to form an up-sampled vertical edge correcting signal;
discriminating between horizontal image edges and horizontal block edges to form an horizontal edge correcting signal; and
combining the vertical and horizontal edge correcting signals with a delayed version of the input video signal to reduce blocking artifacts.

28. The method of claim 27 wherein forming the vertical or horizontal edge correcting signal comprises locating a nearest block edge transition to a pel, and forming an edge correcting signal arranged to change a value of the pel proportionally to a size of the transition and a distance of the pel from the transition.

29. A non-transitory computer program product comprising program code configured to cause one or more computers executing the program code to:
input a video signal;
perform a preprocessing step of:
determining an average size of block edge transitions in an image; and
determining, from the average size, a threshold size of transition above which edges are not removed;
detect block and image content edges using an edge detector function;
discriminate between image content edges and block edges; and
conceal the block edges.

30. The non-transitory computer program product of claim 29 wherein the computer program product comprises a computer storage medium that stores the program code.

* * * * *

UNITED STATES PATENT AND TRADEMARK OFFICE
CERTIFICATE OF CORRECTION

| | | |
|---|---|---|
| PATENT NO. | : 8,515,202 B2 | Page 1 of 1 |
| APPLICATION NO. | : 12/513980 | |
| DATED | : August 20, 2013 | |
| INVENTOR(S) | : Mitchell | |

It is certified that error appears in the above-identified patent and that said Letters Patent is hereby corrected as shown below:

In the Specification

In Column 2, Line 28, delete "Sodel," and insert -- Sobel, --, therefor.

In Column 3, Line 50, delete "Sodel," and insert -- Sobel, --, therefor.

In Column 4, Line 51, delete "is logical" and insert -- is a logical --, therefor.

In Column 5, Line 2, delete "FIG. 9" and insert -- FIG. 9; --, therefor.

In Column 5, Line 9, delete "invention." and insert -- invention; --, therefor.

In Column 5, Line 56, insert -- A next step in processing requires that information relating to the image content in the edge map 22 be removed by means of a post-processing step, or detail discrimination function 23. This attenuates or removes edges that are part of the image content and are not related to the block edges. This leaves the block edges to dominate. -- as a new paragraph.

In Column 6, Line 22, delete "function the edge detector sub-system" and insert -- function. --, therefor.

In the Claims

In Column 13, Line 63, in Claim 2, delete "Sodel" and insert -- Sobel --, therefor.

In Column 15, Line 9, in Claim 14, delete "configured receive" and insert -- configured to receive --, therefor.

In Column 15, Line 41, in Claim 16, delete "Sodel" and insert -- Sobel --, therefor.

Signed and Sealed this
Eleventh Day of February, 2014

Michelle K. Lee
*Deputy Director of the United States Patent and Trademark Office*